US012809863B2

(12) United States Patent
McCullars

(10) Patent No.: US 12,809,863 B2
(45) Date of Patent: Nov. 24, 2026

(54) COMPUTER SYSTEM, COMPUTER-IMPLEMENTED METHOD AND COMPUTER-READABLE MEDIA FOR PERFORMING LOCAL AND REMOTE SEARCHES

(71) Applicant: Shopify Inc., Ottawa (CA)

(72) Inventor: David McCullars, Austin, TX (US)

(73) Assignee: Shopify Inc., Ottawa (CA)

( * ) Notice: Subject to any disclaimer, the term of this patent is extended or adjusted under 35 U.S.C. 154(b) by 10 days.

(21) Appl. No.: 18/943,081

(22) Filed: Nov. 11, 2024

(65) Prior Publication Data

US 2026/0133967 A1 May 14, 2026

(51) Int. Cl.
*G06F 16/2453* (2019.01)
*G06F 16/248* (2019.01)

(52) U.S. Cl.
CPC ...... *G06F 16/24539* (2019.01); *G06F 16/248* (2019.01)

(58) Field of Classification Search
CPC ......................... G06F 16/24539; G06F 16/248
USPC .......................................................... 707/713
See application file for complete search history.

(56) References Cited

U.S. PATENT DOCUMENTS

| | | | | |
|---|---|---|---|---|
| 7,330,846 | B1 * | 2/2008 | Dirisala | G06F 11/30 707/999.009 |
| 2007/0088681 | A1 * | 4/2007 | Aravamudan | G06F 16/252 |
| 2014/0324455 | A1 * | 10/2014 | Schimanski | G06Q 10/06 705/2 |
| 2017/0103132 | A1 * | 4/2017 | Wall | G06F 16/9537 |
| 2019/0080008 | A1 * | 3/2019 | Tseng | G06F 16/9538 |
| 2020/0242184 | A1 * | 7/2020 | Chengalvala | G10L 17/00 |

OTHER PUBLICATIONS

Explore the Power and Benefits of Search-as-you-Type Technology; available online as early as Sep. 3, 2024; https://www.luigisbox.com/blog/search-as-you-type/.

* cited by examiner

*Primary Examiner* — Joshua Bullock
(74) *Attorney, Agent, or Firm* — CPST Intellectual Property Inc.; Brett J. Slaney

(57) ABSTRACT

A system and method for performing parallel local and remote searches, in particular to searching a local cache and remote database in parallel while accepting a search input, to obtain additional data for the local cache. The method includes, responsive to detecting a first portion of a search input, searching a local cache using the first portion to populate a search results list and initiating a remote search using the first portion; and responsive to receiving remote search results from the remote search, updating the search results list based on the remote search results and updating the local cache with data associated with items in the remote search results.

20 Claims, 10 Drawing Sheets

COMPUTER SYSTEM, COMPUTER-IMPLEMENTED METHOD AND COMPUTER-READABLE MEDIA FOR PERFORMING LOCAL AND REMOTE SEARCHES

TECHNICAL FIELD

The following generally relates to performing local and remote searches, in particular, to searching a local cache and remote database in response to accepting a search input, to obtain additional data for the local cache.

BACKGROUND

Portable electronic devices that are used to look up information but have limited storage or memory constraints may be required to access a remote data source to obtain desired information. This may create latency and memory/cache management challenges.

BRIEF DESCRIPTION OF THE DRAWINGS

Embodiments will now be described with reference to the appended drawings wherein.

DETAILED DESCRIPTION

Figure 1:
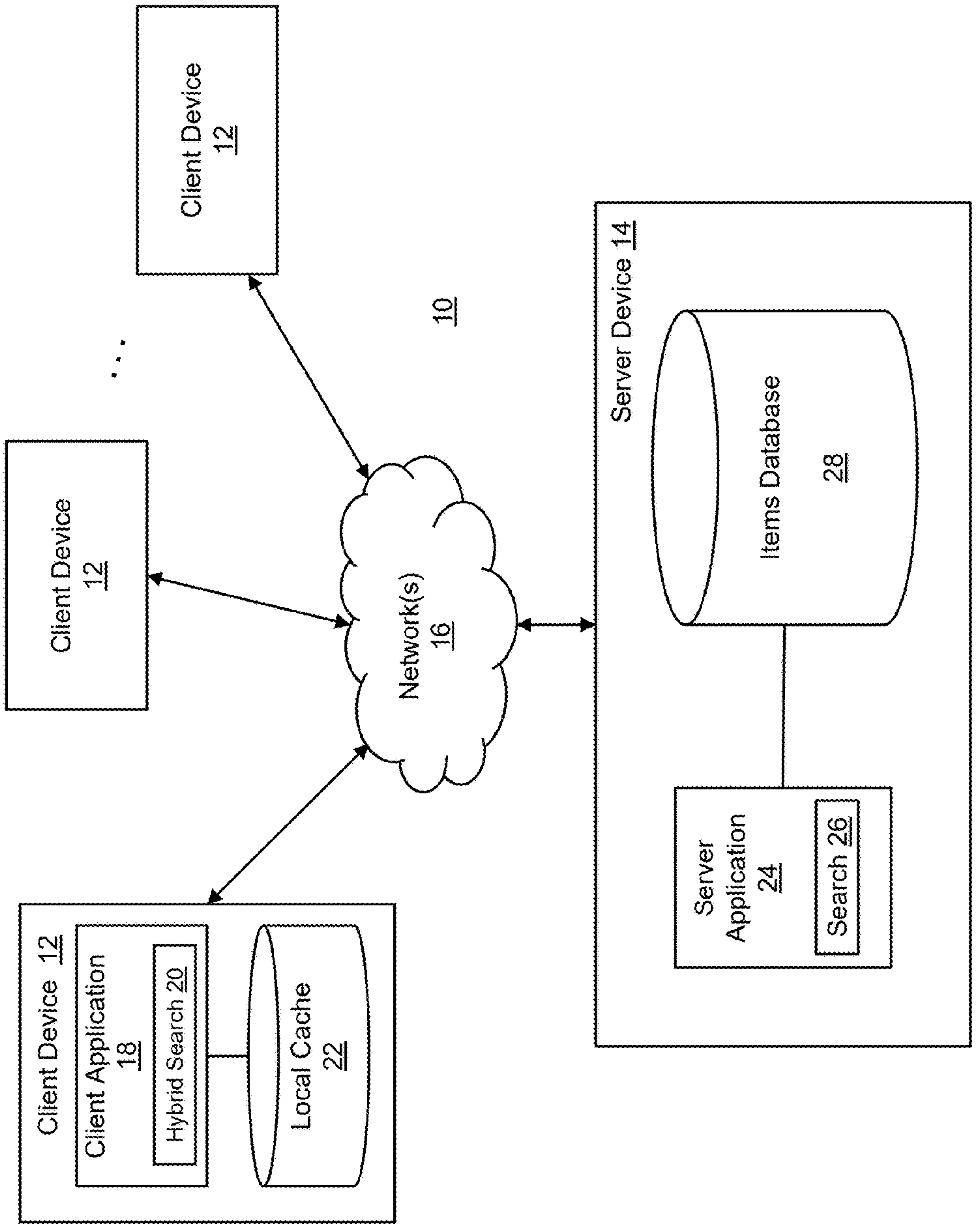
FIG. 1 is an example of a computing environment in which a client application may utilize a hybrid search using a local cache and database at a remote server device.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

Relying on a remote source for search results may result in a slow user experience due to network latency and the need for multiple round-trip requests, in particular for client devices geographically distant from servers. However, the common solution of caching data locally on each client device may be problematic when the storage available on those devices is not sufficiently large. In particular, large product catalogs, client/customer data, and order/download/query histories all may require considerable storage and, the limited on-device cache may not be able to accommodate all necessary data. Consequently, the system may frequently need to query remote databases to fetch the most relevant or up-to-date results. However, this approach may introduce significant latency due to network roundtrips, which depend on the network quality and speed of connectivity. Consequently, users may experience delays in receiving search results, negatively impacting usability of the portable client device.

The system described herein may be configured to implement a parallel "hybrid" local and remote search that executes predictive remote queries as the user enters a search input (e.g., as they are typing) to pre-load, pre-populate, update or what may be referred to herein as "heat up" a local cache.

For example, when a user begins to type a search query, the search may be conducted concurrently using the local cache and by calling a remote server. If any results can be found on the local cache, and while the remote query is being executed, an initial list of results may be populated. Taking advantage of the typical delays attributed to a user manually typing a search query, the remote server may analyze the search query and return its results with associated data, to preheat the local cache with the associated data while the user finishes typing the query and/or pauses to review any intermediate results that were immediately available in the local cache. In this way, the remote results can preheat the local cache with the data associated with the items the user is likely trying to uncover. When the user selects an item from the search results list, the associated data (e.g., item details, specifications, multimedia, etc.) may already be available locally to speed up access to that data.

An example workflow may include:

1. Detect typing and trigger local and remote searches.
2. Local search returns a list of top results (e.g., top 5), based on current contents of local cache and this may be displayed in a UI (e.g., drop-down list).
3. While typing continues, remote search results come back with additional results (e.g., top 20).
4. Search results UI may be updated with returned results, and returned results may be indexed and the associated data added to local cache.
5. If item not yet selected from UI, rerun both searches when typing stops and reorder list, if necessary, based on updated local cache from remote search.
6. Detect selection of item from list.
7. Provide associated data from local cache based on selected item (e.g., display item details).

The parallel hybrid search methodology implemented by the system may be applied in any environment in which a mobile terminal is used to: a) look up and select an item from a set of items; and b) provide associated data for that item where the catalogue of all items and associated data are too voluminous or rapidly changing to store locally, thus requiring access to a remote database. That is, the system described herein may provide a data storage and retrieval solution to address latency challenges and user interface problems associated with having too few or too many search results. That is, the described solution may be applicable in many environments, with POS being only one example. For example, as discussed further below, the hybrid search may be implemented on a remote terminal used for diagnostics, repairs, updates, labeling, inventory management, etc.

The predictive mechanism(s) applied by either or both the local client device and the remote server device may be implemented in various ways, depending on certain data or signals available to the device(s). For example, signals such as the user's location, a user/client identifier (ID), prior search history, and items available in the catalogue of items may be used to compute suggested search terms and to prioritize the associated data that is used to preheat the local cache. These signals may be detected by the portable client device and communicated to the remote server device and/or the remote server device may be capable of detecting these signals themselves.

Moreover, when queries are sent to the remote server device, they may additionally include an indication of the available space in the local cache and which data is likely stale or least recently accessed. This information may be used to influence the size of the payload and the remote matching algorithm used. For example, the number of remote search result items may be increased or decreased according to the amount of space available in the local cache.

As the user types, both the remote and local systems may continuously update. The local cache may maintain an updated index for quicker access to relevant data, reducing time to load search results. To optimize data retrieval, the remote server device may be informed about the current state of the local cache, allowing the remote server device to filter out duplicate items from the return payload, thus reducing the time taken for the data to be received by the client device. Such filtering may, additionally or alternatively, be performed by the client device. In cases where ample space is available in the client device's local cache, to avoid delays with sending large amounts of data, the data may be returned in two or more separate payloads. For example, a first payload may contain highly scored match results, while subsequent payloads may include related items to enrich the search experience.

In one aspect, there is provided a computer-implemented method, comprising, responsive to detecting a first portion of a search input, searching a local cache using the first portion to populate a search results list and initiating a remote search using the first portion; and responsive to receiving remote search results from the remote search, updating the search results list based on the remote search results and updating the local cache with data associated with items in the remote search results.

In certain example embodiments, the method further includes presenting the search results list.

In certain example embodiments, presenting the search results list includes presenting an initial search results list based on the search results list as populated by searching the local cache using the first portion, and updating the presented initial search results list based on the search results list as updated based on the remote search results.

In certain example embodiments, the method further includes accessing data associated with an item selected from the search results list, from the local cache.

In certain example embodiments, the accessed data associated with the selected item is data that was added to the local cache based on the remote search results.

In certain example embodiments, initiating the remote search includes sending a query to a remote data source, the query comprising an indication of available space in the local cache to control a size of the remote search results.

In certain example embodiments, the remote search results are provided using a plurality of payloads.

In certain example embodiments, a first payload includes a prioritized portion of the remote search results.

In certain example embodiments, the method further includes maintaining an item index for the local cache and updating the item index as the local cache is updated.

In certain example embodiments, a predictive search algorithm is executed using at least the first portion of the search input.

In certain example embodiments, the predictive search algorithm utilizes at least one signal associated with an entity conducting the search.

In certain example embodiments, the at least one signal comprises a location signal, a prior search signal, and/or a context signal associated with a catalogue of items being searched.

In certain example embodiments, the method further includes initiating a further remote search responsive to detecting at least a second portion of the search input.

In certain example embodiments, the first and second portions of the search input each include one or more entered characters.

In certain example embodiments, the method further includes further updating the search results list responsive to detecting that a remaining portion of the search input has been entered.

In another aspect, there is provided a computer system comprising: a processor; and a memory, the memory comprising processor executable instructions that, when executed by the processor, cause the computer system to: responsive to detecting a first portion of a search input, search a local cache using the first portion to populate a search results list and initiating a remote search using the first portion; and responsive to receiving remote search results from the remote search, update the search results list based on the remote search results and updating the local cache with data associated with items in the remote search results.

In certain example embodiments, the system further includes processor executable instructions that, when executed by the processor, cause the computer system to present the search results list.

In certain example embodiments, presenting the search results list includes presenting an initial search results list based on the search results list as populated by searching the local cache using the first portion, and updating the presented initial search results list based on the search results list as updated based on the remote search results.

In certain example embodiments, the system further includes processor executable instructions that, when executed by the processor, cause the computer system to access data associated with an item selected from the search results list, from the local cache.

In another aspect, there is provided a computer-readable medium storing processor executable instructions that, when executed by a processor of a computer system, cause the computer system to: responsive to detecting a first portion of a search input, search a local cache using the first portion to populate a search results list and initiating a remote search using the first portion; and responsive to receiving remote search results from the remote search, update the search results list based on the remote search results and updating the local cache with data associated with items in the remote search results.

Turning now to the figures, FIG. 1 illustrates an example of a computing environment 10. The computing environment 10 in this example includes one or more client devices 12 that communicate with a remote server device 14 via one or more networks 16. In the example shown in FIG. 1, a number of client devices 12 are capable of communicating with the remote server device 14, which number may vary based on the computing environment 10. Any one or more of such client devices 12 may operate as described herein to obtain data and information from the remote server device 14. The client device 12 may include a client application 18 that utilizes a search tool, function, module, or utility that is configured to perform a hybrid searching process that searches locally on the client device 12 and remotely by communicating with the remote server device 14, and which may hereinafter be referred to as a hybrid search 20.

The hybrid search 20 may access a local cache 22 to perform a local portion of the hybrid search operations and, via the client application 18, communicate with a server application 24 at the remote server device 14, to obtain additional search results and/or data and information associated with such items from an items database 28. The items database 28 may be embodied as a catalogue, inventory, repository, table, or any other data storage structure utilized by the remote server device 14 to maintain a collection of items and associated data. For example, in a POS scenario, the client device 12 may utilize the hybrid search 20 to obtain data associated with an inventory of items to conduct a checkout process, e.g., when the POS device (embodied in or coupled to a client device 12) is used to lookup items being purchased at the checkout. In another example, the client device 12 may represent a remote diagnostics computer terminal that is used to lookup firmware or software updates, security patches or other data objects at a local site, which have associated data that are obtained from the remote server device 14.

The client device 12 and/or remote server device 14 may be implemented using one or more computing devices 40 (e.g., see FIG. 5 described below) or computing systems. Such computing devices 40 or computing systems may include, but are not limited to, a mobile phone, a personal computer, a laptop computer, a server computer, a tablet computer, a notebook computer, a hand-held computer, a personal digital assistant, a portable navigation device, a wearable device, a gaming device, an embedded device, a portable terminal (e.g., POS device), a virtual reality device, an augmented reality device, etc.

The local cache 22 as used herein may refer to various types of caches or local storage elements, for example, a standard cache (e.g. Apollo cache). Such standard caches may use logic such as "if given input X, return result set Y from the cache". Other types of caches using enhanced logic may be used, additionally or alternatively, for example using technologies similar to those used in the remote search 26, including, without limitation, fuzzy matching, advanced tokenization, term frequency ranking, multi-language, etc. Traditionally, a cache hit would be based on having a match for a cache key, which would be a unique input. Consider the following example, wherein a user initially begins searching for 'boots'. To do so, they type the characters 'bo' in the search bar. The system executes remote and local searches in an 'as-you-type' fashion (using the various search algorithms such as those described above). The system searches both locally and remotely as herein described. Local results may return an existing result for 'bonnet'. On the remote side, the server may determine based on the input, that 'boots' and 'body wash' are relevant matches for the current search input. The system pulls in these results from the server device 14 and stores them in the local storage (assume they were not already on the local storage for the sake of this example). At a later point, in a subsequent search, the user searches for 'body wash'. When they finish typing 'bo' this time, there will be a match in the local results for the previously retrieved 'body wash' result. This time, the same input 'bo' resulted in a different set of local hits. Logic can still be applied over these hits to determine the order of presentation (based on signals e.g., frequent searches, most sold, etc.). Notably, pulling the 'boots' and 'body wash' results onto local storage was not based on a cache miss for 'bo' but rather on a search algorithm run on the remote server device 14, which contrasts to a traditional cache search.

The one or more networks 16 shown in FIG. 1 may include a telephone network, cellular, and/or data communication network to connect different types of client- and/or server-type devices. For example, the communication network 16 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The remote server device 14 may also be implemented using one or more computing devices 40 or computing systems. The server device 14 in this example hosts a server application 14 that is complementary to or otherwise configured to serve the client application 18 in order to perform the remote part of the hybrid search 20. The remote part of the hybrid search may be referred to herein as the remote search, denoted by numeral 26, shown as search 26 in FIG. 1. The remote search 26 is utilized by the server application 24 to access items in the items database 28 to determine suitable items 32 to return as remote search results, along with associated data 34 for those items 32 (see FIG. 2). It can be appreciated that the server application 24 and remote search 26 are delineated as shown in FIG. 1 for illustrative purposes and may instead be embodied using a single application, function, tool, etc. that is operated by the server device. The remote search 26 may be configured to perform predictive searches based on portions of an input, as described by way of example herein. The remote search 26 may additionally perform a one-to-one lookup based on a completed input.

Figure 2:
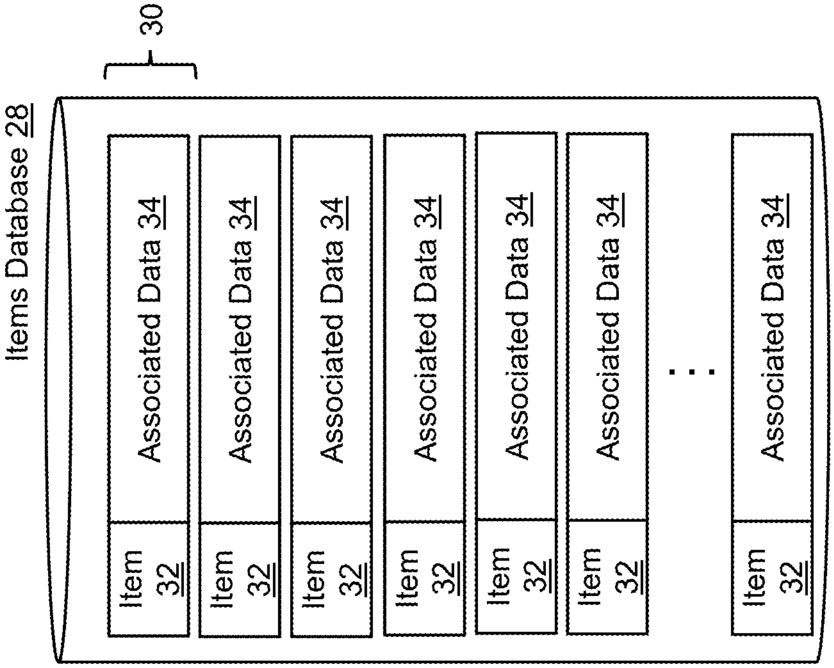
FIG. 2 illustrates an example of an items database.
Figure 3:
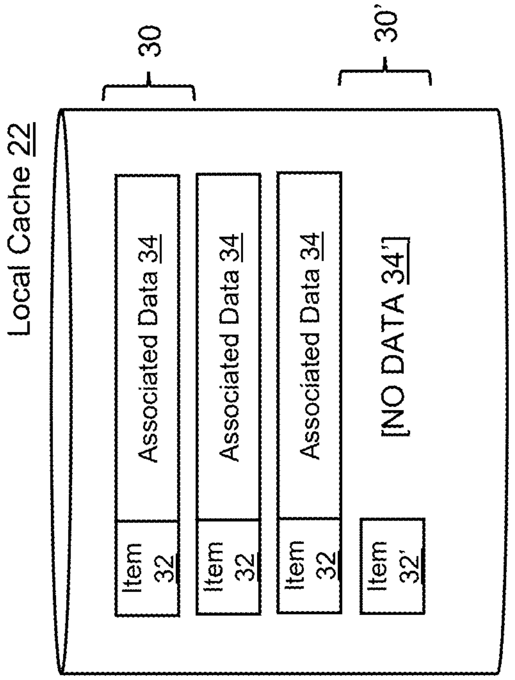
FIG. 3 illustrates an example of a local cache.

As illustrated pictorially in FIGS. 2 and 3, the local cache 22 may have less storage space than the items database 28, resulting in a limited amount of data being available locally to the client device 12. For example, a catalogue of items 32 used by a remote POS device may be too voluminous to store locally. Moreover, centrally controlled updates may be considered more efficient when multiple POS devices are deployed to local sites. As such, the client device 12 may be configured to utilize access to the remote server device 14 to lookup items 32 and their associated data 34 when conducting a search using the client application 18. While storage requirements are reduced at the local site, latency may be introduced when having to continually query the remote server device 14 to find an item 32 at the client device 12.

The hybrid search 20 as described herein, may balance these competing objectives by initiating parallel local and remote searches in an attempt to identify potential items 32 and associated data 34 to preheat the local cache 22 while the user input is being entered. In this way, taking advantage of typical delays associated with manually entering a search input, can allow the associated data 34 to be available at the client device 12 more efficiently. For example, portions of the input may be used while the user is entering the input to predict the item 32 that the user is seeking to have the associated data 34 available to the local cache 22 by the time the item 32 is selected.

The items database 28 is shown in FIG. 2 and includes a number of database entries 30. These entries 30 each identify an item 32 (e.g., name, ID, SKU, serial number, etc.). Each item 32 may include associated data 34. The associated data 34 may include, without limitation, item name, item description, item multimedia (photos, video, etc.), inventory ID(s), warranty information, loyalty information, reviews, cost/price per unit, etc. For example, product-related items sought by a POS client device 12 may include various details related to that product to enable a user to associate a price per unit on a price tag with an inventory entry. When a scanner and machine-readable indicia (barcode, QR code, etc.) are not used to scan an item, the hybrid search 20 may be used to perform a look-up by conducting a search query.

As shown in FIG. 3, the local cache 22 typically includes a smaller capacity and thus may only be capable of storing a subset of the items 32 in the items database 28, e.g., the most recently searched, most frequently searched, or some other metric. The local cache 22 may also include incomplete entries 30', in this case, an incomplete item 32' that does have any associated data 34' available locally. For example, the item 32' may be identified using a signal or some other context, e.g., based on a user type, but not have the associated data 34' obtained from a previous search. The incomplete item 32' may be identified in the search query send to the remote server device 14 as a prioritized item 32 for which to provide the associated data 34 in the returned remote search results.

Figure 4:
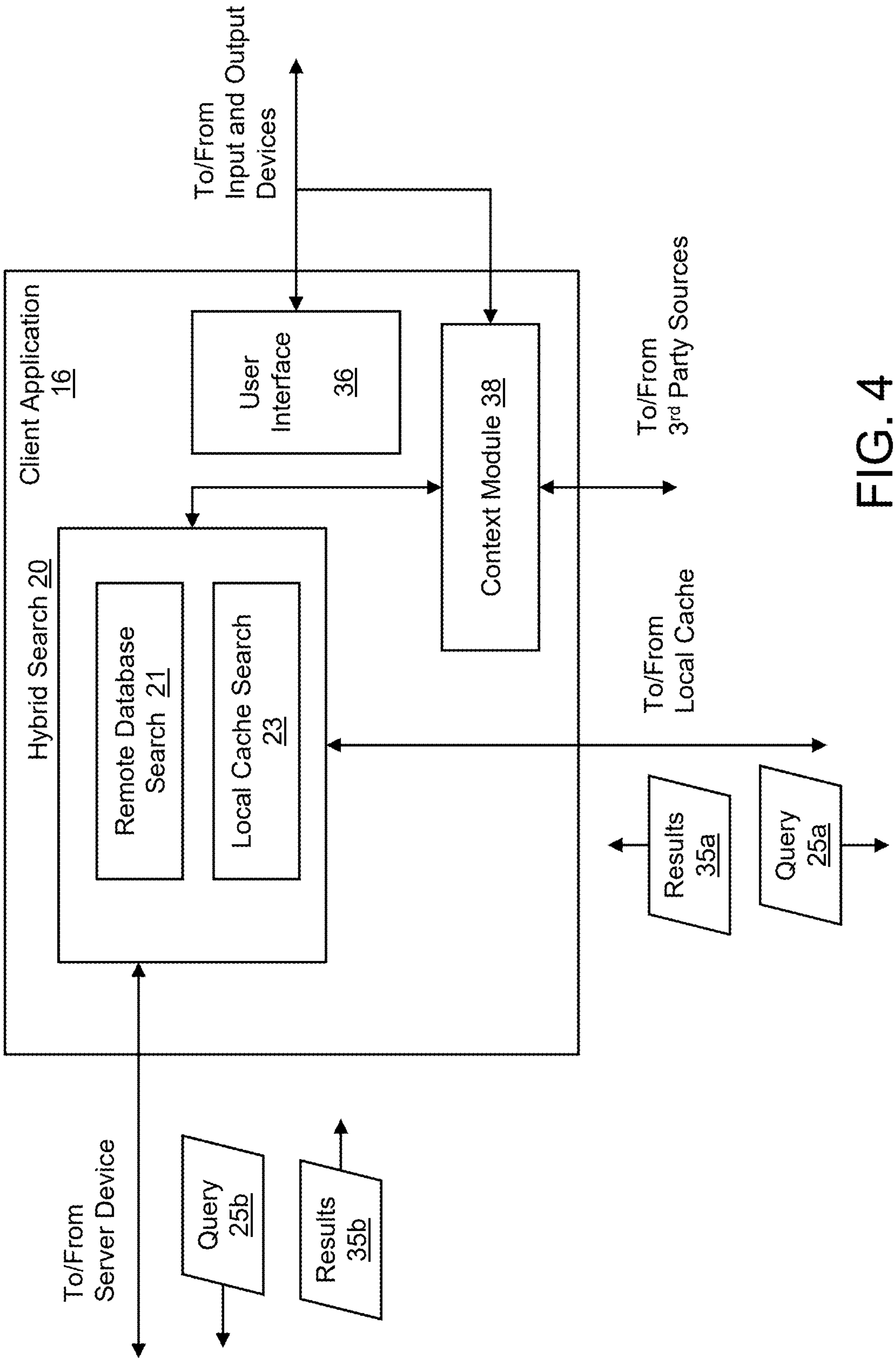
FIG. 4 illustrates an example of a configuration for a client application using a hybrid search.

FIG. 4 shows an example of a configuration for the client application 16. The client application in this configuration includes or has access to the hybrid search 20. The client application 16 may also include a UI 36 and a context module 38. The context module 38 may obtain signals and/or contextual data and information from, for example, input/output devices associated with the client device 12. For example, the client device's location may be used to tailor a predictive search algorithm to more intelligently predict the item 32 the user is looking for when performing a lookup. The context module 38 may, additionally or alternatively, obtain signals and/or contextual data and information from external 3$^{rd}$ party sources. For example, the client application 16 may detect that the client device 12 is checked in with a retail location and use this information to tailor a predict search. Contextual information may also include, for example, search histories, past purchases, customer profile information, stored user preferences, demographic information, shared information from other client devices (e.g., from a group of POS devices at a site), etc.

The hybrid search 20 includes modules, functions, program code, scripts, tools or other computer programs for conducting a remote database search 21 and for conducting a local cache search 23.

The local cache search 23 is configured to communicate via an internal interface within the client device 12 with the local cache 22 to send a query **25*a* to the local cache 22 for locally stored items 32 and associated data 34. For example, the local cache 22 may have enough storage capacity to store a certain number of items 32 and associated data 34 from one or more recent searches. The local query 25*a* may be executed by the local cache search 23 accessing the local cache 22 directly (e.g., using a database query) or may communicate with another program or utility responsible for granting access to the local cache 22 or executing the local query 25*a* for the local cache search 23 and hybrid search 20 functions. The local query 25*a* may generate a set of local search results 35*a*, which may be used by the client application 16 to display an initial set of results in the UI 36. As indicated above, contextual data obtained by the context module 38 may be used by the hybrid search 20 in structuring the local query 25*a* and/or filtering the local search results 35*a***.

The remote database search 21 is configured to communicate using an interface between the client application 16 and, in this example, the server application 24 to send a remote query **25*b* to the server application 24 to perform a search of the remotely located items database 28. The items database 28 in this example includes a complete set of items 32 and associated data 34 for which only a subset is likely stored locally in the local cache 22. The remote query 25*b* may include contextual data obtained by the context module 38 and may include additional information such as a list of items 32 already stored locally, a size of the local cache 22, etc. In this way, the server application 24 may execute intelligent predictive analytics to generate a set of remote search results 35*b* that are returned to the hybrid search 20. Moreover, in cases where ample space is available in the local cache 22, to avoid delays with sending large amounts of data, the results 35*b* may be returned by the remote server device 14 in two or more separate payloads. For example, a first payload may contain highly scored match results, while subsequent payloads may include related items 32** to enrich the search experience.

To perform a predictive analysis or predictive search, in addition to contextual data obtained from the client device 12 (e.g., using the context module 38), other information may be available to the server application 24 conducting the remote search 26. For example, this may utilize past search queries made by that client device 12, in the context of a subscription- or relationship-based configuration, past orders or deliveries; client preferences; client location; etc. The items 32 and associated data 34 may additionally have term frequency scores used to determine a term's relevancy to a query **25*b*. Other tools such as an Elasticsearch™ search engine allow for "fuzzy matching" via Levenshtein distance, enabling a target element to be found in the search space provided by the items database 28. In some optional cases, the target element may even be found using an incorrect input, including inputs that have typos, etc. The number of returned items in the search results 35*b* may be dictated and/or adjusted based on the size of the local cache 22, network speed or bandwidth capabilities, size of the collection in the items database 28, among other things. The query 25*b* may include signals that affect the number of returned items, such as by indicating the amount of available space in the local cache 22. The local cache 22 may additionally be expandable based on other local memory and storage requirements. Filtering may additionally be applied to search results, e.g., to avoid returning remote search results that are already being stored locally by the local cache 22**.

It can be appreciated that the hybrid search 20 may be more efficient than, for example, standard auto-complete or similar word wheel searches that may require a server call after each portion of the input is received and relies on the server to compute the prediction at each call. Instead, the hybrid search 20 uses the local cache 22 to obtain an initial set of search results that may be augmented and/or improved by the remote search results that are performed in parallel and may leverage the additional time taken to enter second and further portions of the input to pre-heat the local cache 22 with a predicted results from the complete search input.

Figure 5:
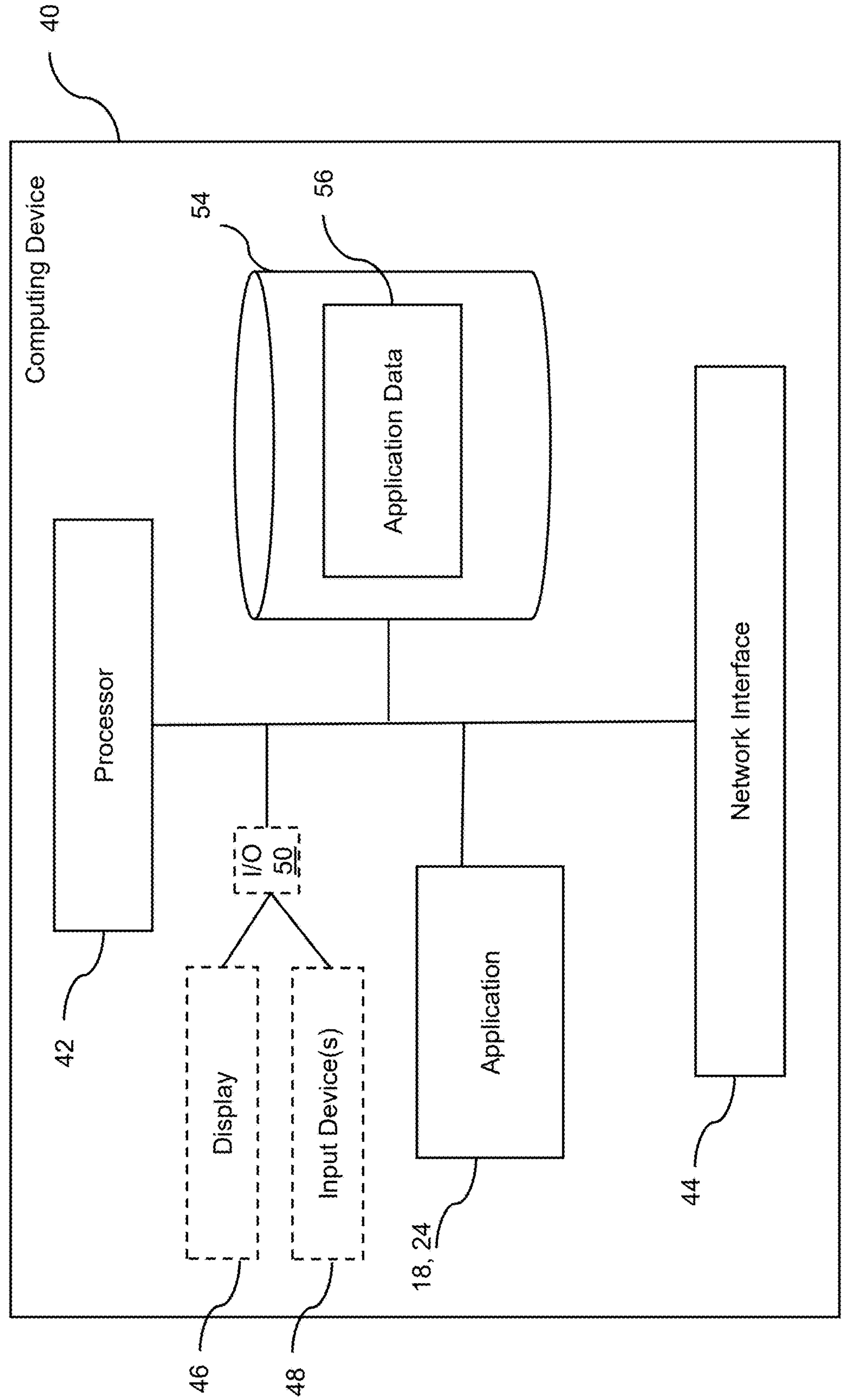
FIG. 5 is an example of a computing device operable to communicate in the computing environment.

FIG. 5 shows an example of a computing device 40 which may be utilized by any one or more of the entities shown in FIG. 1, for example, the client device 12 and/or the server device 14.

In this example, the computing device 40 includes one or more processors 42 (e.g., a microprocessor, microcontroller, embedded processor, digital signal processor (DSP), central processing unit (CPU), media processor, graphics processing unit (GPU) or other hardware-based processing units) and one or more network interfaces 44 (e.g., a wired or wireless transceiver device connectable to a network via a communication connection).

Examples of such communication connections can include wired connections such as twisted pair, coaxial, Ethernet, fiber optic, etc. and/or wireless connections such as LAN, WAN, PAN and/or via short-range communications protocols such as Bluetooth, WiFi, NFC, IR, etc.

The computing device 40 may also include an application 18, 24 (e.g., according to a device type), a data store 54, and application data 56.

The data store 54 may represent a database or library or other computer-readable medium configured to store data and permit retrieval of data by the computing device 40. The data store 54 may be read-only or may permit modifications to the data. The data store 54 may also store both read-only and write accessible data in the same memory allocation. In this example, the data store 54 stores the application data 56 for the application 18, 24 that is configured to be executed by the computing device 40 for a particular role or purpose.

While not delineated in FIG. 5, the computing device 40 includes at least one memory or memory device that can include a tangible and non-transitory computer-readable medium having stored therein computer programs, sets of instructions, code, or data to be executed by processor(s) 42. The processor(s) 42 and network interface(s) 44 are connected to each other via a data bus or other communication backbone to enable components of the computing device 40 to operate together as described herein. FIG. 5 illustrates examples of modules and applications stored in memory on the computing device 40 and executed by the processor(s) 42.

It can be appreciated that any of the modules and applications shown in FIG. 5 may be hosted externally and may be available to the computing device 40, e.g., via a network interface 44. The data store 54 in this example stores, among other things, the application data 56 that can be accessed and utilized by the application 18, 24. The data store 54 may additionally store one or more software functions or routines in a cache or in other types of memory.

As shown in FIG. 5, the computing device 40 may, optionally (e.g., when configured as a client device 12), include a display 46 and one or more input device(s) 48 that may be utilized via an input/output (I/O) module 50. That is, such components may be omitted when the computing device 40 does not interact with a user.

Figure 6:
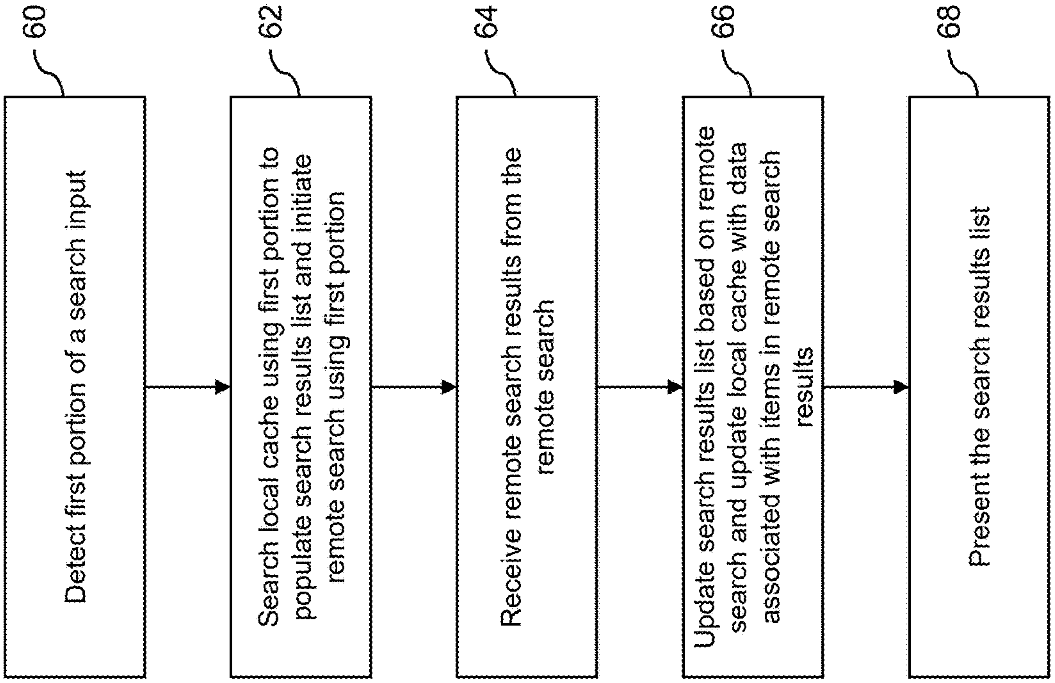
FIG. 6 is a flow chart illustrating example operations performed in searching a local cache and initiating a remote search to generate a search results list and update the local cache with data associated with items in remote search results.

FIG. 6 is a flow chart illustrating example operations performed in executing a hybrid search 20. At block 60, the client application 18 detects a first portion of a search input, e.g., a first few characters of a typed search keyword or keywords.

At block 62, the hybrid search 20 uses the first portion of the search input to initiate a local cache search 23 to search the local cache 22, e.g., by preparing and sending a local query **25*a* to the local cache 22. The results 35*a* from the local search are used to populate a search results list, e.g., by displaying a set of search results in the UI 36. Using the first portion of the search input, the hybrid search 20 also initiates, in parallel, a remote database search 21 to search the items database 28, e.g., by preparing and sending a remote query 25*b* to the server application 24 or the items database 28** directly.

At block 64, the client application 18 receives the remote search results **35*b* from the remote search and, at block 66, the search results list may be updated based on the remote search, and the local cache 22 may be updated with the data associated with the items 32 returned in the remote search. It can be appreciated that the local cache 22, if full, may be updated to evict items 32 and associated data 34** currently being held. This may be done on a first-in-first-out (FIFO) basis (e.g., for customer/client data), or based on other factors for an item basis, such as most recently sold/used, most searched, etc.

At block 68, the search results list may be presented, e.g., in a drop-down list or other UI element in the UI 36.

Figure 8:
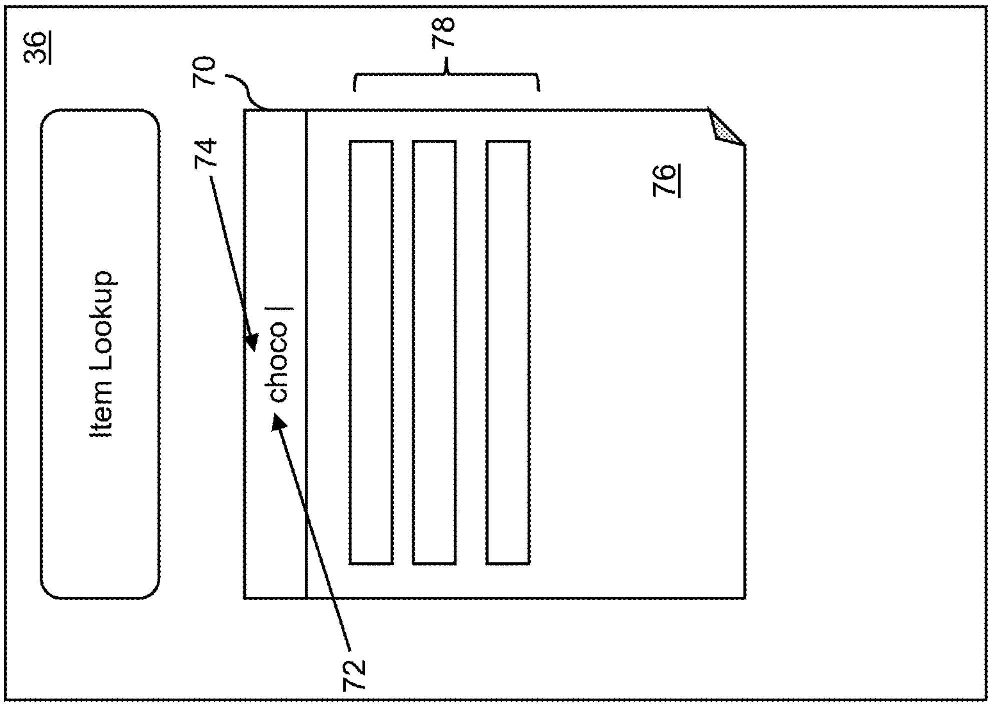
FIG. 8 illustrates the item lookup UI showing an additional portion of the search input and an initial search results list.
Figure 7:
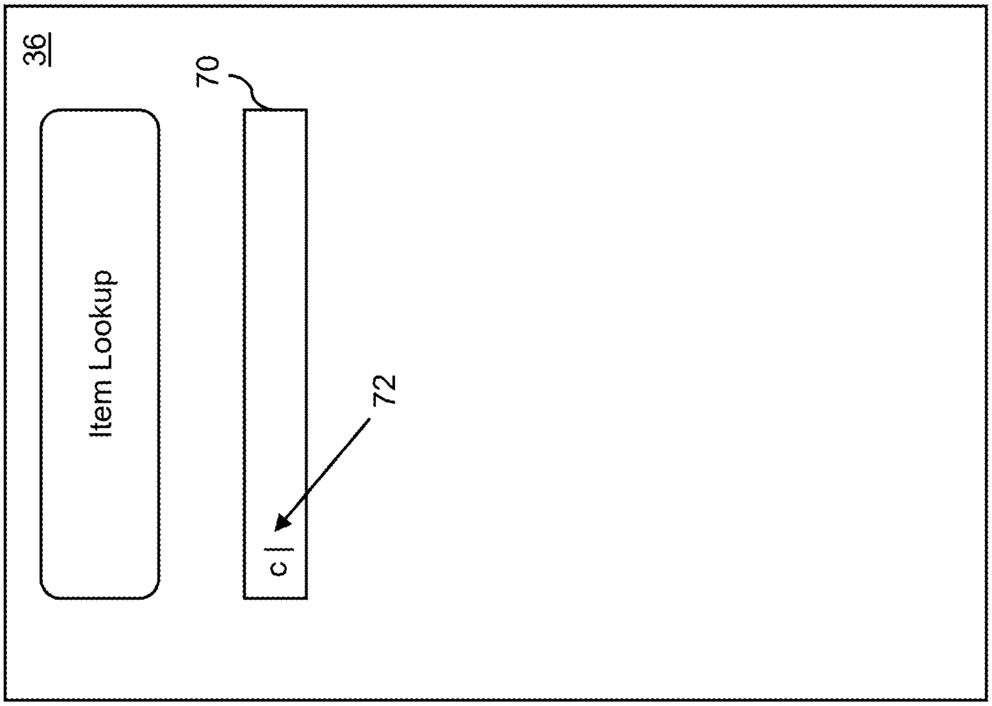
FIG. 7 illustrates an item lookup user interface (UI) showing a first portion of a search input.
Figure 9:
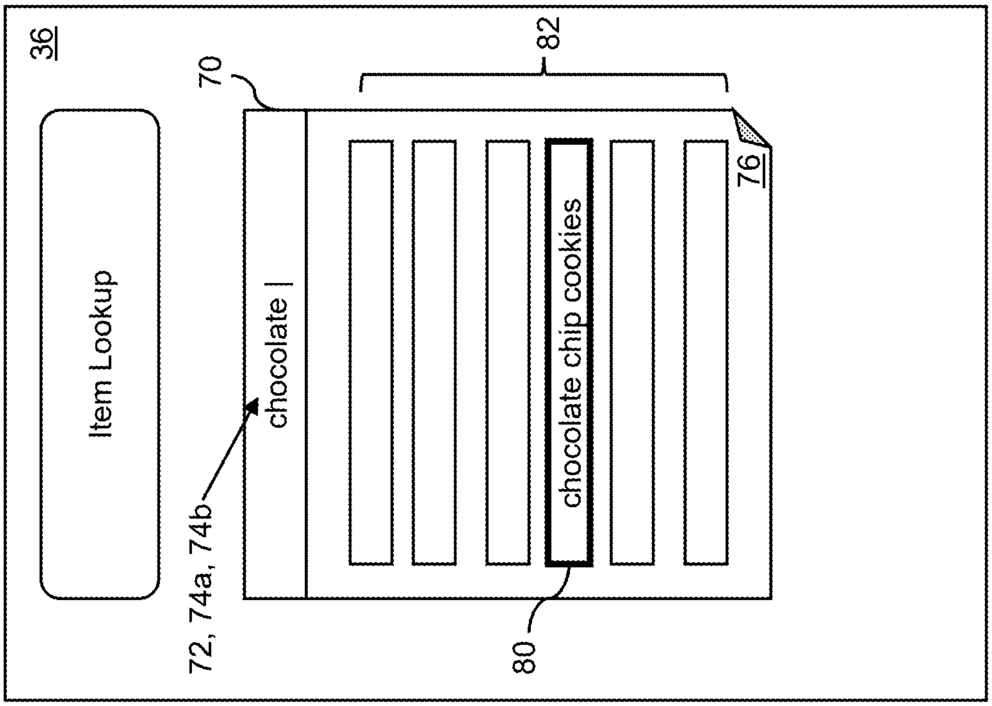
FIG. 9 illustrates the item lookup UI showing another additional portion of the search input and an updated search results list.

FIGS. 7 through 11 illustrate an example of the UI 36 shown in FIG. 4, which may be used by the client application 16 to interact with a user that is utilizing the hybrid search 20. Referring first to FIG. 7, an item lookup page is shown in the UI 36. The item lookup page includes a search bar 70 and illustrates a first portion 72 of a search input, in this example, "c". As shown in FIG. 8, the hybrid search 20 may be configured to initiate the hybrid local and remote queries **25*a*, 25*b* using the first portion 72. The hybrid search 20 may continue to accept an additional portion 74 of the search input, in this example, "hoco" such that the search input is currently "choco". A drop-down UI element 76 may be displayed as shown in FIG. 8, with an initial search results list 78. The list 78 may include a list of IDs (e.g., names) of items 32 that are found in the local cache 22. The list 78 may be updated as remote search results 35*b* are received from the server device 14, e.g., as shown in FIG. 9**.

Figure 10:
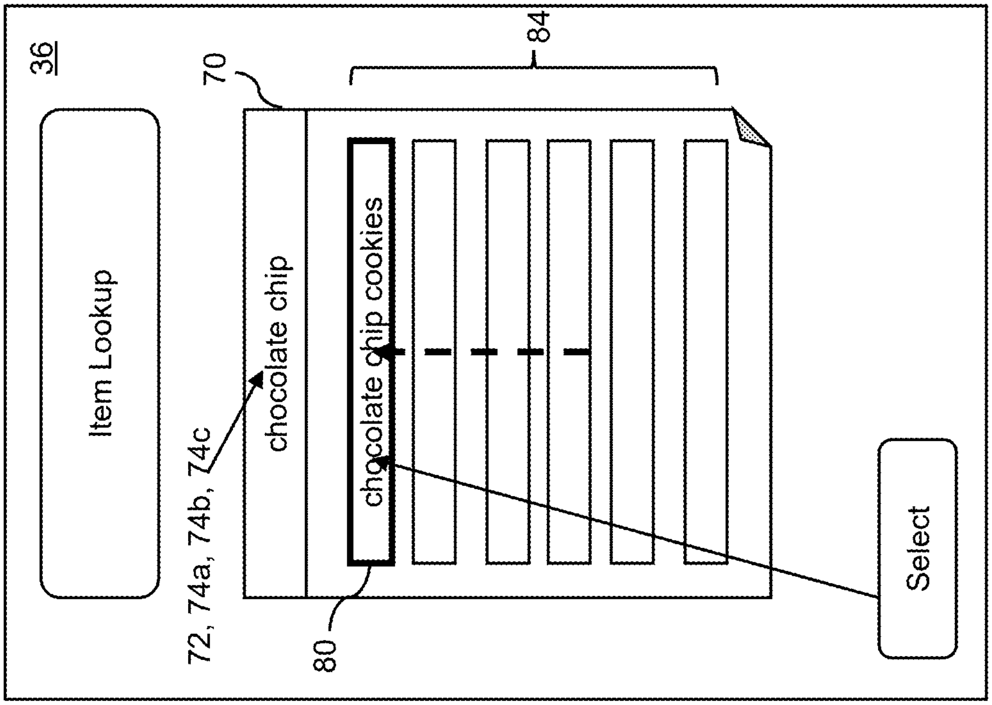
FIG. 10 illustrates the item lookup UI showing a completed search input and a reordered search results list.
Figure 11:
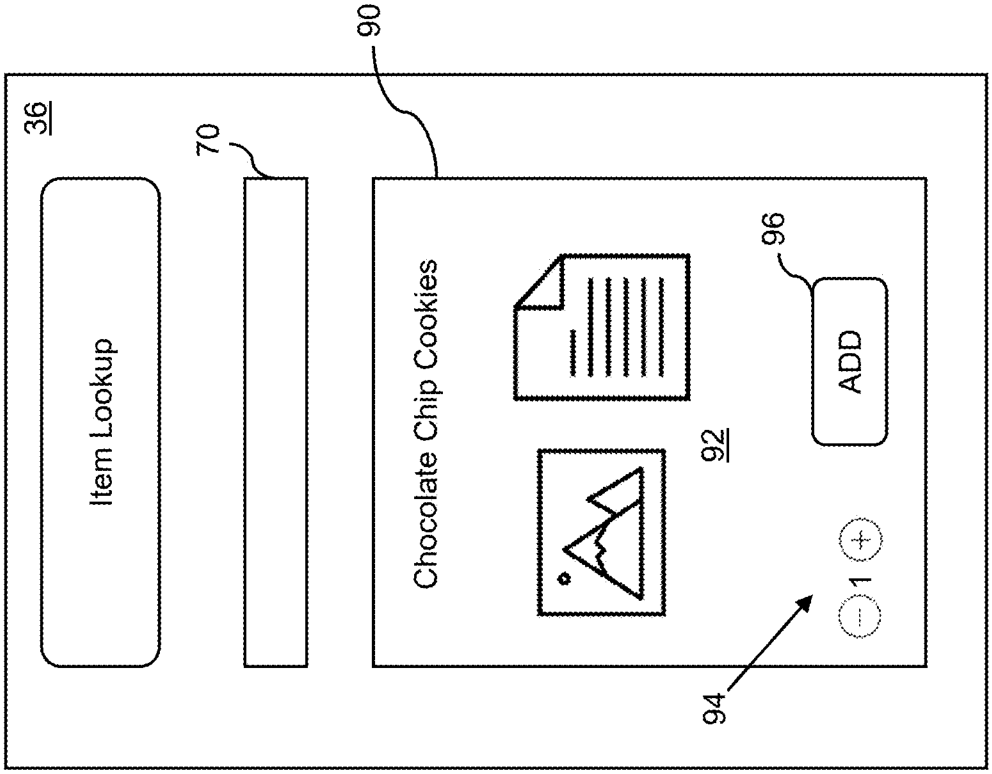
FIG. 11 illustrates additional data presented for a selected item in the search results list to enable items to be selected in a point-of-sale (POS) application.

Referring now to FIG. 9, the search input at this stage includes the first portion 72 and two additional portions **74*a*, 74*b* entered in the search bar 70, together reading: "chocolate". The initial search results list 78 is now updated or replaced by an updated search results list 82. The search results list 82 includes an item 80, namely "chocolate chip cookies". This item 80 may have been uncovered in the local cache 22 or have been returned in the remote search results 35*b*. As an additional portion 74*c* of the search input is entered in the search bar 70 as shown in FIG. 10, the item 80 "chocolate chip cookies" may be pushed up a reordered list 84 based on the current search input, which now reads "chocolate chip". It can be appreciated that the search input 72, 74*a-c*, as it is being entered, may be used to conduct the remote search query 25*b*, which may have identified "chocolate chip cookies" as one of its predicted results. The associated data 34 for this item 32 stored in the items database 28 may be returned such that the local cache 22 is pre-heated with the associated data 34. In this way, by selecting the item 80 as shown in FIG. 10, the associated data 34 may be used to display an item page 90 as shown in FIG. 11. In this example, the item page 90 may include multimedia elements 92 and a quantity selector 94 to allow the user to add the item 32, 80 by selecting an add button 96**.

Figure 12:
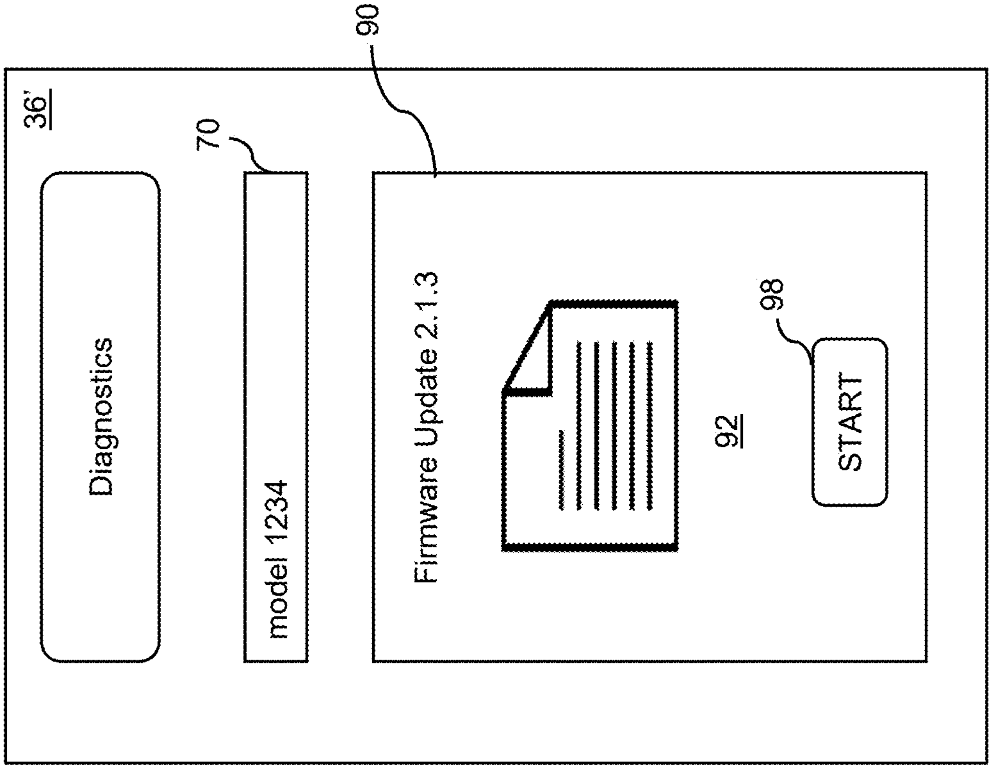
FIG. 12 illustrates additional data presented for an item selected in a search conducted in a diagnostics firmware update application.

FIG. 12 illustrates an example of a UI 36' for a software download/update application that may be used by a client terminal for applying software or firmware updates to a computer-operated device at a local site. In this example, the search bar 70 may be used to lookup a device model or other ID to locate the associated data 34, in this example, "firmware update 2.1.3". The update may include update notes 92 or other associated data 34 and provide a start button 98 to initiate the update process. As such, the hybrid search 20 may be utilized in various contexts and applications to pre-heat a local cache 22 that is capable of holding only a subset of a larger catalogue or collection of items 32 and associated data 34.

Figure 13:
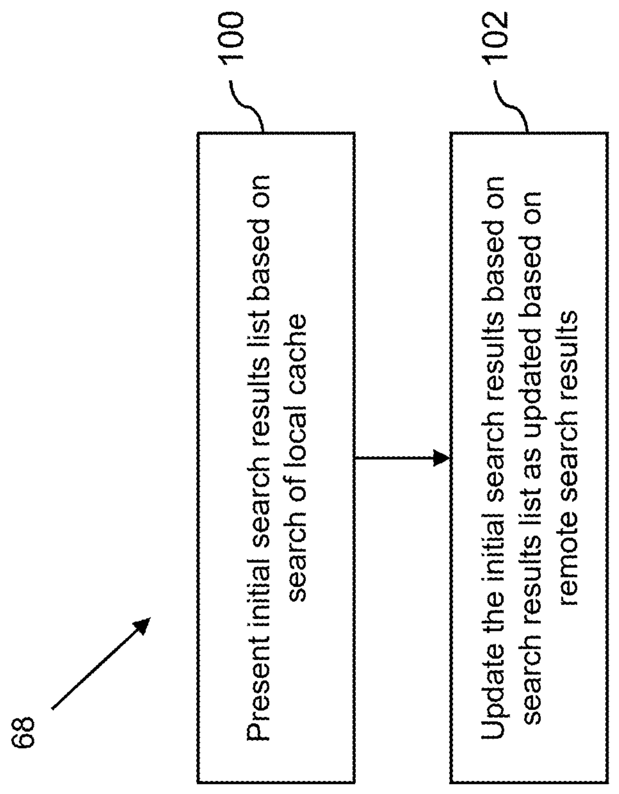
FIG. 13 is a flow chart illustrating example operations performed in presenting and updating a search results list.

FIG. 13 is a flow chart illustrating example operations performed in updating the initial search results, e.g., to present search results as illustrated in block 68 of FIG. 6. At block 100, an initial search results list may be presented as shown in, for example, FIG. 8. At block 102, the initial search results list may be updated, e.g., as shown in FIGS. 9 and/or 10, based on the search results list as updated based on the remote search results **35*b***.

Figure 14:
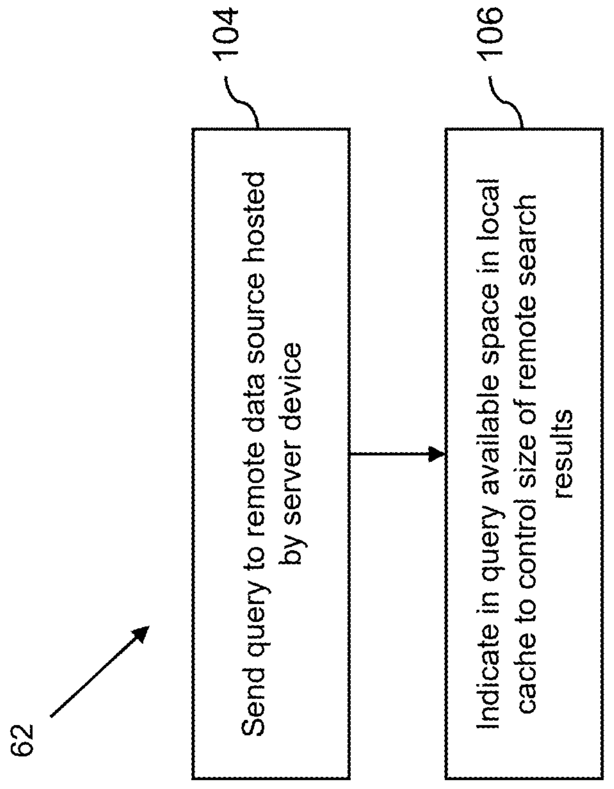
FIG. 14 is a flow chart illustrating example operations performed in sending a query to a remote data source to obtain remote search results.

FIG. 14 is a flow chart illustrating example operations performed in sending a remote query **25*b*, e.g., as illustrated in FIG. 4. At block 104, the query 25*b* may be sent to the remote data source, e.g., the items database 28 hosted by the server device 14. At block 106, the query 25*b* may indicate available space in the local cache 22, e.g., if the local cache 22 is not currently full, to enable the server application 24 to control the size of the remote search results 35*b* that are returned. For example, if the local cache 22 is empty, the remote search results 35*b* may be used to fill up the local cache 22 to facilitate initial search results in subsequent searches via the local query 25*a*. Moreover, as noted above, in cases where ample space is available in the local cache 22**, to avoid delays with sending large amounts of data, the data may be returned in two or more separate payloads. For example, a first payload may contain highly scored match results, while subsequent payloads include related items to enrich the search experience.

Figure 15:
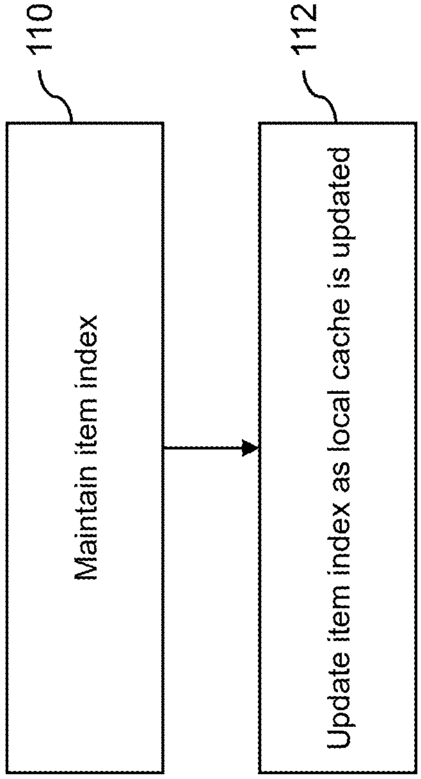
FIG. 15 is a flow chart illustrating example operations performed in maintaining and updating an item index.

FIG. 15 is a flow chart illustrating example operations performed in managing the local cache 22. In this example, the local cache 22 maintains an item index at block 110. At block 112, the item index may be updated as the local cache 22 is updated, e.g., after receiving remote search results **35*b* and/or pre-heating the local cache 22 using such remote search results 35*b***.

Figure 16:
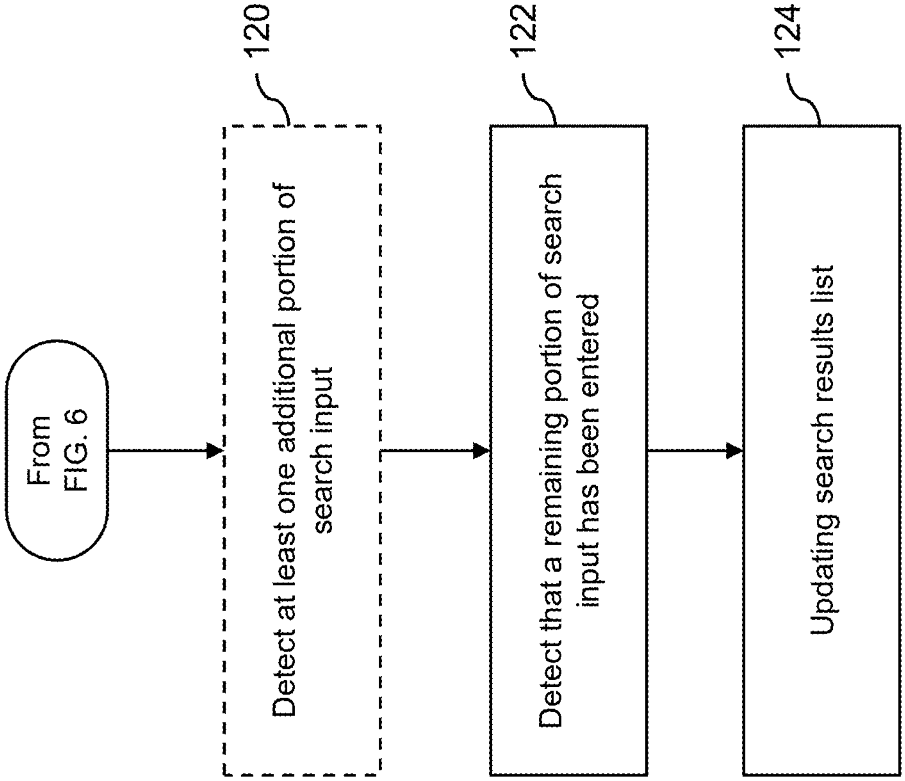
FIG. 16 is a flow chart illustrating example operations performed in updating a search results list as additional portions of a search input are entered.

FIG. 16 is a flow chart illustrating example operations performed in updating and/or rerunning a hybrid search 20, e.g., as a continuation of what is shown in FIG. 6. At block 120, optionally (as indicated using dashed lines), at least one additional portion of the search input may be detected (e.g., portions 72, **74*a*, 74*b*, 7*c* in FIGS. 9 and 10). At block 122, the client application 12 may detect that a remaining portion of a search input (e.g., upon entry of portion 74*c* as shown in FIG. 10) has been entered. For example, after completing entry of text, the user may select a search button or press an enter key. At block 124, the search results list may be updated, e.g., as shown in FIG. 10, to reorder or replace current items 80 with other items from the local and/or remote search results 35*a*, 35*b*. This may be performed to further facilitate identification and selection of a desired item 80 from the list 84**, e.g., if the user pauses to review the search results before making a selection.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method comprising:

responsive to detecting a first portion of a search input, searching a local cache using the first portion to populate a search results list and initiating a remote search using the first portion, wherein initiating the remote search comprises sending a query to a remote data source, the query comprising an indication of available space in the local cache to control a size of the remote search results; and responsive to receiving remote search results from the remote search, updating the search results list based on the remote search results and updating the local cache with data associated with items in the remote search results.

2. The method of claim 1, further comprising presenting the search results list.

3. The method of claim 2, wherein presenting the search results list comprises:

presenting an initial search results list based on the search results list as populated by searching the local cache using the first portion; and updating the presented initial search results list based on the search results list as updated based on the remote search results.

4. The method of claim 1, further comprising accessing data associated with an item selected from the search results list, from the local cache.

5. The method of claim 4, wherein the accessed data associated with the selected item is data that was added to the local cache based on the remote search results.

6. The method of claim 1, wherein the remote search results are provided using a plurality of payloads.

7. The method of claim 6, wherein a first payload comprises a prioritized portion of the remote search results.

8. The method of claim 1, further comprising maintaining an item index for the local cache and updating the item index as the local cache is updated.

9. The method of claim 1, wherein a predictive search algorithm is executed using at least the first portion of the search input.

10. The method of claim 9, wherein the predictive search algorithm utilizes at least one signal associated with an entity conducting the search.

11. The method of claim 10, wherein the at least one signal comprises a location signal, a prior search signal, and/or a context signal associated with a catalogue of items being searched.

12. The method of claim 1, further comprising initiating a further remote search responsive to detecting at least a second portion of the search input.

13. The method of claim 12, wherein the first and second portions of the search input each comprise one or more entered characters.

14. The method of claim 1, comprising further updating the search results list responsive to detecting that a remaining portion of the search input has been entered.

15. The system of claim 14, wherein the remote search results are provided using a plurality of payloads.

16. A computer system comprising:

a processor; and a memory, the memory comprising processor executable instructions that, when executed by the processor, cause the computer system to:

responsive to detecting a first portion of a search input, search a local cache using the first portion to populate a search results list and initiating a remote search using the first portion, wherein initiating the remote search comprises sending a query to a remote data source, the query comprising an indication of available space in the local cache to control a size of the remote search results; and responsive to receiving remote search results from the remote search, update the search results list based on the remote search results and updating the local cache with data associated with items in the remote search results.

17. The system of claim 16, further comprising processor executable instructions that, when executed by the processor, cause the computer system to:

present the search results list.

18. The system of claim 17, wherein presenting the search results list comprises:

presenting an initial search results list based on the search results list as populated by searching the local cache using the first portion; and updating the presented initial search results list based on the search results list as updated based on the remote search results.

19. The system of claim 16, further comprising processor executable instructions that, when executed by the processor, cause the computer system to:

access data associated with an item selected from the search results list, from the local cache.

20. A non-transitory computer-readable medium storing processor executable instructions that, when executed by a processor of a computer system, cause the computer system to:

responsive to detecting a first portion of a search input, search a local cache using the first portion to populate a search results list and initiating a remote search using the first portion, wherein initiating the remote search comprises sending a query to a remote data source, the query comprising an indication of available space in the local cache to control a size of the remote search results; and responsive to receiving remote search results from the remote search, update the search results list based on the remote search results and updating the local cache with data associated with items in the remote search results.

* * * * *